(12) United States Patent
Shan

(10) Patent No.: US 12,131,165 B2
(45) Date of Patent: Oct. 29, 2024

(54) METHOD AND APPARATUS FOR ACQUIRING INFORMATION

(71) Applicant: Beijing Baidu Netcom Science Technology Co., Ltd., Beijing (CN)

(72) Inventor: Tengfei Shan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 178 days.

(21) Appl. No.: 17/580,477

(22) Filed: Jan. 20, 2022

(65) Prior Publication Data

US 2022/0147373 A1    May 12, 2022

(30) Foreign Application Priority Data

May 26, 2021 (CN) .......................... 202110577725.7

(51) Int. Cl.
*G06F 9/44* (2018.01)
*G06F 9/445* (2018.01)

(52) U.S. Cl.
CPC ................................ *G06F 9/44505* (2013.01)

(58) Field of Classification Search
CPC .................. G06F 1/32; G06F 9/44; G06F 1/12
See application file for complete search history.

(56) References Cited

U.S. PATENT DOCUMENTS

| 8,230,370 | B2 * | 7/2012 | Nomura | ................... | G06F 30/30 |
| | | | | | 716/136 |
| 9,632,861 | B1 * | 4/2017 | Watanabe | ........... | G06F 11/0778 |

| 2019/0324784 | A1 * | 10/2019 | Liang | ...................... | G06F 9/542 |
| 2020/0280448 | A1 * | 9/2020 | Ithal | ........................ | H04L 69/22 |
| 2021/0011906 | A1 * | 1/2021 | Matsumura | ............. | G06F 16/93 |

FOREIGN PATENT DOCUMENTS

| CN | 103986942 | A | 8/2014 |
| CN | 109951338 | A | 6/2019 |
| CN | 111182022 | A | 5/2020 |
| CN | 112260863 | A | 1/2021 |
| JP | 2000-003287 | A | 1/2000 |

(Continued)

OTHER PUBLICATIONS

European Search Report issued for European Patent Application No. 22 15 1193, dated Apr. 13, 2022 in 9 pages.

*Primary Examiner* — Keshab R Pandey
(74) *Attorney, Agent, or Firm* — Knobbe, Martens, Olson & Bear, LLP

(57) ABSTRACT

Some embodiments of the present disclosure discloses a method and apparatus for acquiring information, relates to the technical field of information transmission and distributed network architecture. The method includes: determining, in response to receiving an instruction used to indicate to acquire configuration information, for each of a plurality of physical machines, a set of candidate processes of the physical machine; acquiring a first key value, and determining a target candidate process of the physical machine from the set of candidate processes based on the first key value; acquiring a second key value, and determining a target process from a plurality of target candidate processes determined based on the plurality of physical machines based on the second key value; and acquiring the configuration information using the target process.

8 Claims, 8 Drawing Sheets

(56) References Cited

FOREIGN PATENT DOCUMENTS

| JP | 2002-535792 A | 10/2002 |
| JP | 2009-519504 A | 5/2009 |
| JP | 2010-522372 A | 7/2010 |
| JP | 2020-178180 A | 10/2020 |
| WO | WO 2020/148663 A1 | 7/2020 |

\* cited by examiner

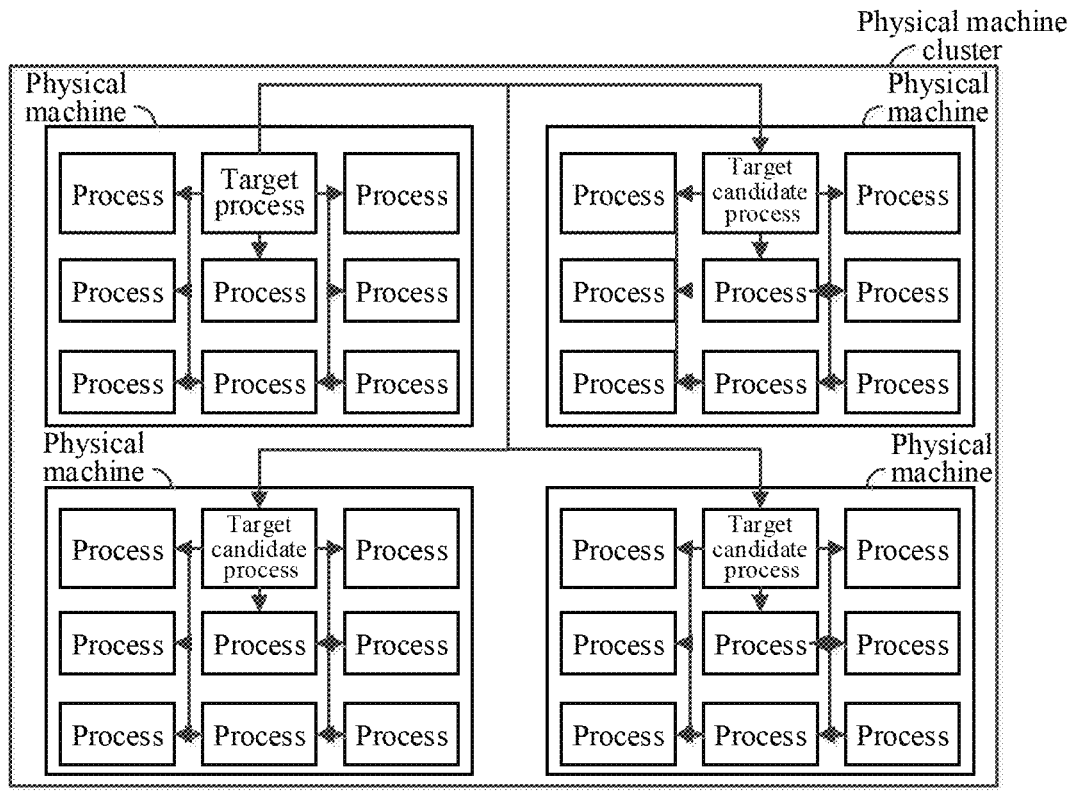

Determining, for a plurality of physical machine clusters in each network layer, a target physical machine cluster in the network layer

502

Acquiring, in response to determining that the network layer is not a preset layer in the data distribution network, configuration information from an upper-level target process using a target process in the target physical machine cluster

Fig. 5

METHOD AND APPARATUS FOR ACQUIRING INFORMATION

CROSS-REFERENCE TO RELATED APPLICATIONS

This application claims priority to Chinese Patent Application No. 202110577725.7, filed with the China National Intellectual Property Administration (CNIPA) on May 26, 2021, the contents of which are incorporated herein by reference in their entirety.

TECHNICAL FIELD

The present disclosure relates to the field of computer technology, in particular to the technical field of information transmission and distributed network architecture, and more particular to a method and apparatus for acquiring information.

BACKGROUND

A distributed network usually includes a large number of network nodes (that is, a cluster of physical machines), and the network nodes include a large number of physical machines and service processes. In order to meet the needs of a large number of service processes requesting to acquire configuration information, an interface capacity for responding to requests is usually increased, or the time for responding to requests is prolonged.

SUMMARY

Some embodiments of the present disclosure provides a method and apparatus for acquiring information, an electronic device and a computer readable storage medium.

In a first aspect, embodiments of the present disclosure provide a method for acquiring information, comprising: determining, in response to receiving an instruction used to indicate to acquire configuration information, for each physical machine of a plurality of physical machines, a set of candidate processes of the physical machine; acquiring a first key value, and determining a target candidate process of the physical machine from the set of candidate processes based on the first key value; acquiring a second key value, and determining a target process from a plurality of target candidate processes determined based on the plurality of physical machines based on the second key value; and acquiring the configuration information using the target process.

In a second aspect, embodiments of the present disclosure provide a method for acquiring information, applied to a data distribution network, the data distribution network comprising a plurality of physical machine clusters, each physical machine cluster comprising a plurality of physical machines, the plurality of physical machine clusters belonging to a plurality of network layers, and the method comprising: the physical machine cluster using the method according to the first aspect to acquire configuration information; determining, for a plurality of physical machine clusters in each network layer, a target physical machine cluster in the network layer; and acquiring, in response to determining that the network layer is not a preset layer in the data distribution network, configuration information from an upper-level target process using a target process in the target physical machine cluster, wherein the upper-level target process comprises: the target process of the target physical machine cluster in an upper-level network layer of the network layer.

In a third aspect, embodiments of the present disclosure provide an apparatus for acquiring information, comprising: a first determination unit, configured to determine, in response to receiving an instruction used to indicate to acquire configuration information, for each physical machine of a plurality of physical machines, a set of candidate processes of the physical machine; a second determination unit, configured to acquire a first key value, and determine a target candidate process of the physical machine from the set of candidate processes based on the first key value; a third determination unit, configured to acquire a second key value, and determine a target process from a plurality of target candidate processes determined based on the plurality of physical machines based on the second key value; and a first acquisition unit, configured to acquire the configuration information using the target process.

In a forth aspect, embodiments of the present disclosure provide an apparatus for acquiring information, comprising: applied to a data distribution network, the data distribution network comprising a plurality of physical machine clusters, each physical machine cluster comprising a plurality of physical machines, the plurality of physical machine clusters belonging to a plurality of network layers, and the apparatus comprising: the physical machine cluster using the apparatus according to the third aspect to acquire configuration information; a cluster determination unit, configured to determine, for a plurality of physical machine clusters in each network layer, a target physical machine cluster in the network layer; and a second acquisition unit, configured to acquire, in response to determining that the network layer is not a preset layer in the data distribution network, configuration information from an upper-level target process using a target process in the target physical machine cluster, wherein the upper-level target process comprises: the target process of the target physical machine cluster in an upper-level network layer of the network layer.

In a fifth aspect, embodiments of the present disclosure provide an electronic device, comprising: one or more processors; and a memory, storing one or more programs, wherein the one or more programs, when executed by the one or more processors, cause the one or more processors to implement the method for acquiring information provided by the first aspect or the second aspect.

In a sixth aspect, embodiments of the present disclosure provide a computer-readable medium, storing a computer program thereon, wherein the program, when executed by a processor, causes the processor to implement the method for acquiring information provided by the first aspect or the second aspect.

It should be understood that the content described in this section is not intended to identify key or important features of the embodiments of the present disclosure, nor to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure, in which:

FIG. 4 is a schematic diagram of a path for sending configuration information to a physical machine cluster in the method for acquiring information according to some embodiments of the present disclosure;

FIG. 5 is a flowchart of an embodiment of a method for acquiring information according to the present disclosure;

DETAILED DESCRIPTION

The following describes embodiments of the present disclosure in conjunction with the accompanying drawings, which includes various details of the embodiments of the present disclosure to facilitate understanding, and they should be considered as merely examples. Therefore, those of ordinary skill in the art should recognize that various changes and modifications can be made to the embodiments described herein without departing from the scope and spirit of the present disclosure. Also, for clarity and conciseness, descriptions of well-known functions and structures are omitted in the following description.

Figure 1:
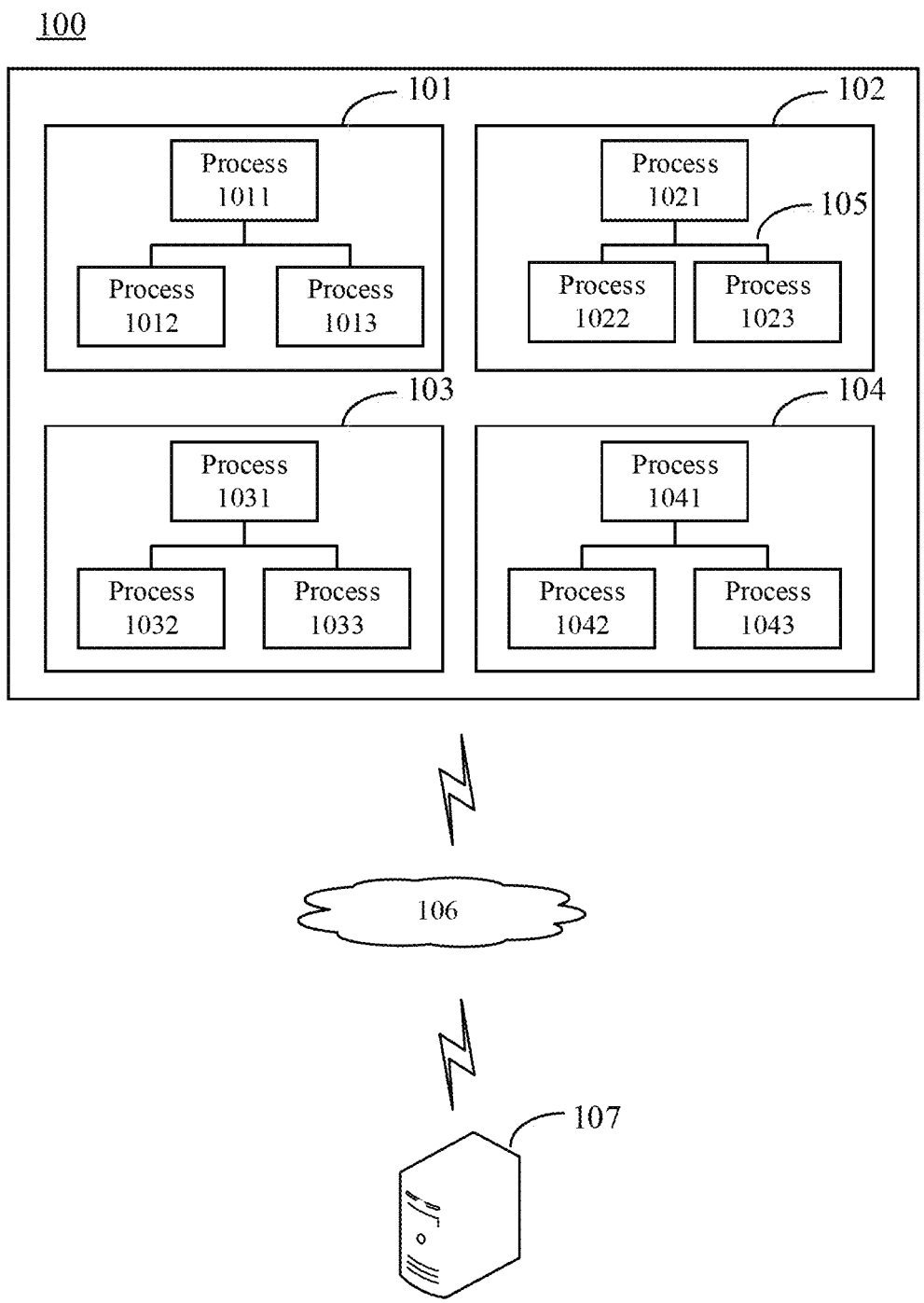
FIG. 1 is an example system architecture diagram to which an embodiment of the present disclosure may be applied.

FIG. 1 shows an example system architecture 100 to which an embodiment of a method for acquiring information or an apparatus for acquiring information of the present disclosure may be applied.

As shown in FIG. 1, the system architecture 100 may include physical machines 101, 102, 103, and 104. The physical machine 101 may include processes 1011, 1012, and 1013, the physical machine 102 may include processes 1021, 1022, and 1023, the physical machine 103 may include processes 1031, 1032, and 1033, and the physical machine 104 may include processes 1041, 1042, and 1043.

The system architecture 100 may include networks 105, 106 and a server 107. The network 105 serves as a medium used to provide a communication link between processes. The network 106 is used to provide a communication link medium between the physical machines and the server, or between the processes in the physical machines and the server. The networks 105 and 106 may include various types of connections, such as wired or wireless communication links, or optical fiber cables.

The physical machines 101, 102, 103, and 104 may be physical devices in a distributed network or a content distribution network, such as servers, terminals, or other hardware devices. The processes in the physical machines may be entities used to execute computer programs in the physical machines.

The server 107 may be a server, a service module, or a processor in a distributed network composed of the physical machines 101, 102, 103, and 104. The server 107 may also be a server, a service module, or a processor connected in communication with the distributed network composed of the physical machines 101, 102, 103, and 104. The server 107 is used to determine the processes in the above distributed network or information exchange between the physical machines, and the server 107 may also be used to determine a method in which the processes in the distributed network acquire configuration information.

When receiving an instruction used to indicate to acquire configuration information, for each of a plurality of physical machines, the server 107 determines a set of candidate processes of the physical machine; acquires a first key value, and determines a target candidate process of the physical machine from the set of candidate processes based on the first key value; acquires a second key value, and determines a target process from a plurality of target candidate processes determined based on the plurality of physical machines based on the second key value; then acquires the configuration information using the target process.

It should be noted that the method for acquiring information provided by the embodiments of the present disclosure is generally executed by the server 107. Correspondingly, the apparatus for acquiring information is generally provided in the server 107.

It should be appreciated that the number of the physical machines, the processes, the networks and the server in FIG. 1 is merely illustrative. Any number of physical machines, processes, networks and servers may be provided according to actual requirements.

Figure 2:
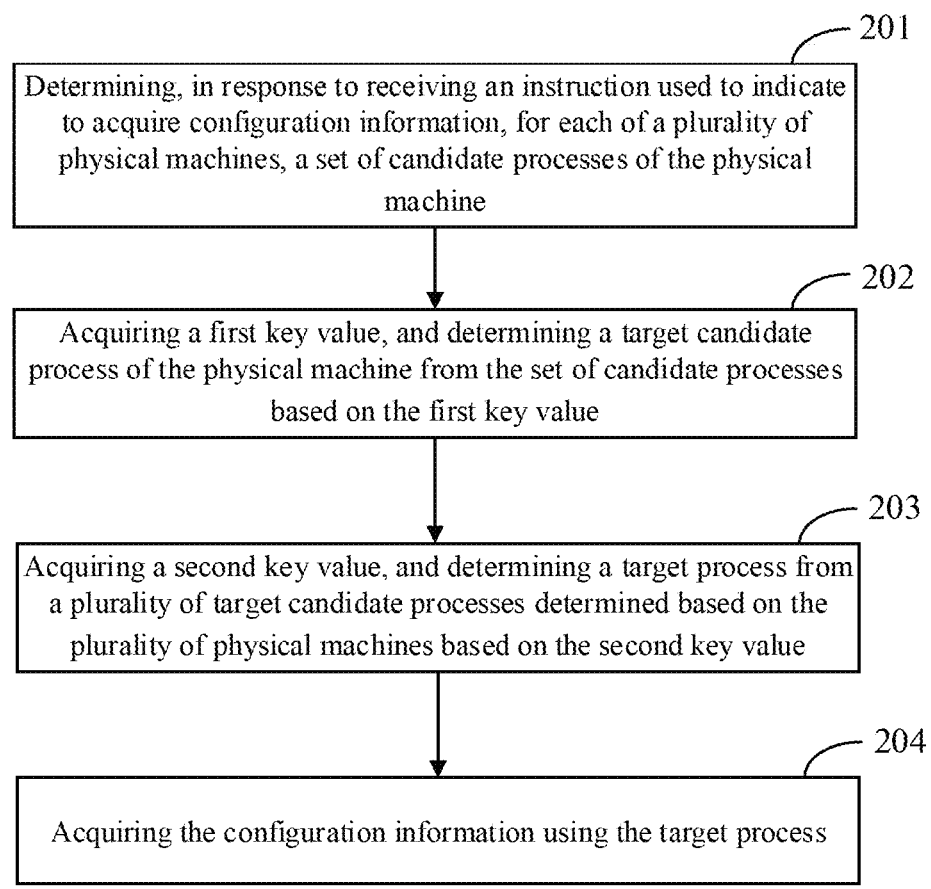
FIG. 2 is a flowchart of an embodiment of a method for acquiring information according to the present disclosure.

With further reference to FIG. 2, illustrating a flow 200 of an embodiment of a method for acquiring information according to the present disclosure. The method for acquiring information includes the following steps:

Step 201, determining, in response to receiving an instruction used to indicate to acquire configuration information, for each of a plurality of physical machines, a set of candidate processes of the physical machine.

In the present embodiment, when an executing body of the method for acquiring information (for example, the server shown in FIG. 1) receives the instruction used to indicate to acquire the configuration information, it may determine the set of candidate processes of the physical machine for each of the plurality of physical machines. The set of candidate processes includes a plurality of candidate processes in the physical machine.

Step 202, acquiring a first key value, and determining a target candidate process of the physical machine from the set of candidate processes based on the first key value.

In the present embodiment, the first key value may be acquired, and the target candidate process of the physical machine may be determined from the set of candidate processes of the physical machine based on the first key value. The first key value may be a random number, and the executing body may determine the target candidate process of the physical machine from the set of candidate processes based on this random number. For example, a candidate process indicated by an IP (Internet Protocol) address or code identifier closest to the random number in the set of candidate processes is determined as the target candidate process. The first key value may also be a preset value, and the executing body may determine the target candidate process of the physical machine from the set of candidate processes based on this preset value. For example, a candidate process indicated by an IP address or code identifier that is greater than the preset value in the set of candidate processes is determined as the target candidate process.

Step 203, acquiring a second key value, and determining a target process from a plurality of target candidate processes determined based on the plurality of physical machines based on the second key value.

In the present embodiment, after obtaining the plurality of target candidate processes based on the plurality of physical machines, the second key value may be acquired, and the target process may be determined from the plurality of target candidate processes based on the second key value. The second key value may be a random number, and the executing body may determine the target process from the plurality of target candidate processes based on this random number. For example, in the plurality of target candidate processes, a target candidate process indicated by an IP address or code identifier closest to the random number is determined as the target process. The second key value may also be a preset value, and the executing body may determine the target process from the plurality of target candidate processes based on this preset value, for example, the IP addresses of multiple target candidate processes that are greater than the preset value Or the target candidate process indicated by the code identifier is determined to be the target process. For example, in the plurality of target candidate processes, a target candidate process indicated by an IP address or code identifier that is greater than the preset value is determined as the target process.

It should be noted that the first key value and the second key value may be the same or different.

Step 204, acquiring the configuration information using the target process.

In the present embodiment, the configuration information may be acquired using the target process. The configuration information may be used to configure the processes or the physical machines.

The method for acquiring information provided by the present embodiment, determining, in response to receiving an instruction used to indicate to acquire configuration information, for each of a plurality of physical machines, a set of candidate processes of the physical machine; acquiring a first key value, and determining a target candidate process of the physical machine from the set of candidate processes based on the first key value; acquiring a second key value, and determining a target process from a plurality of target candidate processes determined based on the plurality of physical machines based on the second key value; and acquiring the configuration information using the target process. The method may determine the target process in the plurality of processes of the plurality of physical machines, and use the target process to acquire the configuration information, avoiding network congestion caused by a plurality of processes acquiring configuration information from a configuration center or source site, and also avoiding the problem of low information acquisition efficiency caused by a plurality of processes taking turns to acquire configuration information from a configuration center or source site.

Secondly, the target candidate process is determined from each physical machine, and then gradual convergence of the target process is determined from the plurality of target candidate processes corresponding to the plurality of physical machines. In this way, when adding a physical machine or adding a process to a certain physical machine, it does not affect the number of processes that acquire configuration information from the configuration center or source site, and avoids the limitation of communication capacity or network transmission capacity on the increase of processes/physical machines. Thereby, the scalability of the distributed network may be improved.

Alternatively, determining a set of candidate processes of the physical machine, includes: acquiring operating status information of a process in the physical machine; and determining, in response to determining that the operating status information satisfies a preset condition, the process corresponding to the operating status information as a process in the set of candidate processes.

In the present embodiment, the step of determining a set of candidate processes of the physical machine may be: acquiring operating status information of a process in the physical machine. If the operating status information of a certain process satisfies the preset condition, the process may be determined as a candidate process, that is, the process is added to the set of candidate processes of the physical machine. The preset condition may be that the process is in a working status/the process is an active process, the preset condition may also be that a business volume/calculation volume of a current load of the process is less than a threshold, and the preset condition may also be that the operating performance of the process (such as communication throughput, computing performance) satisfies a preset performance requirement and so on.

In the present embodiment, a process that satisfies the preset condition is determined as a process in the set of candidate processes, and then the target candidate process is determined from the candidate processes, and the target process is further determined, so that the final target process may meet the needs of a user and may improve the efficiency and accuracy of determining the target process that meets the needs.

Figure 3:
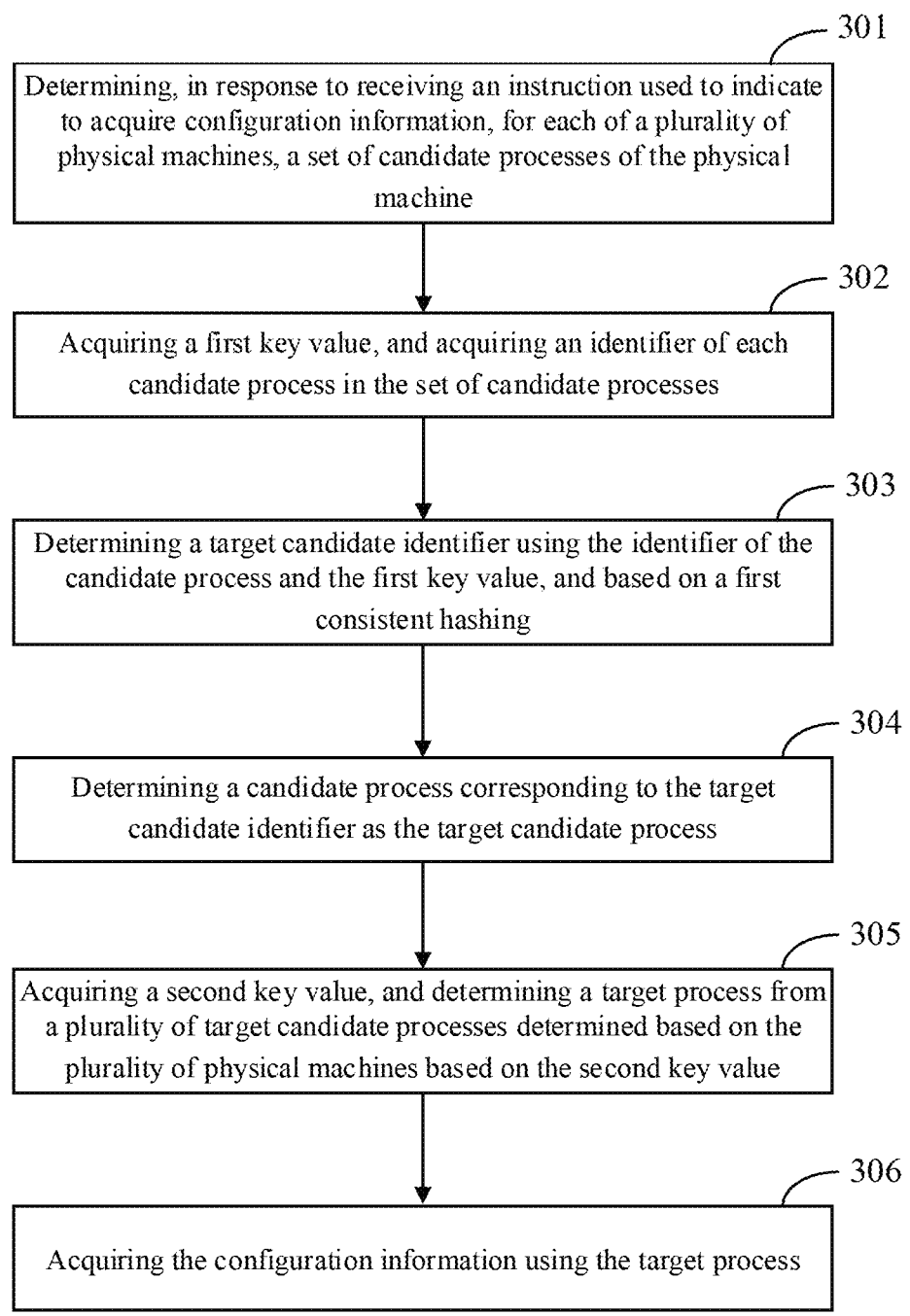
FIG. 3 is a flowchart of another embodiment of the method for acquiring information according to the present disclosure.

With further reference to FIG. 3, illustrating a flow 300 of another embodiment of the method for acquiring information. The flow 300 of the method for acquiring information includes the following steps:

Step 301, determining, in response to receiving an instruction used to indicate to acquire configuration information, for each of a plurality of physical machines, a set of candidate processes of the physical machine.

Step 302, acquiring a first key value, and acquiring an identifier of each candidate process in the set of candidate processes.

In the present embodiment, the executing body may read the preset first key value locally, or read the first key value input by the user through a terminal device. The executing body may read the identifier of each candidate process locally, or read the identifier of each candidate process from a storage unit of the corresponding physical machine. The identifier of the candidate process may be a digital identifier such as an IP address of the candidate process or coding of the candidate process.

Step 303, determining a target candidate identifier using the identifier of the candidate process and the first key value, and based on a first consistent hashing.

In the present embodiment, the executing body may determine the target candidate identifier using the identifier of the candidate process and the first key value, and based on the first consistent hashing. A preset hash algorithm may be used to calculate a hash value corresponding to the identifier of each candidate process, and assign the calculated hash value on a hash ring; the preset hash algorithm is used to calculate a hash value of the first key value, and assign the hash value of the first key value on the hash ring;

move the hash value of the first key value clockwise on the hash ring, and move to an identifier corresponding to a first hash value (it may be understood that after a hash value is calculated through a certain identifier, the hash value corresponds to the identifier), which is determined as the target candidate identifier.

Step 304, determining a candidate process corresponding to the target candidate identifier as the target candidate process.

In the present embodiment, the candidate process corresponding to the target candidate identifier in the set of candidate processes is determined as the target candidate process.

Step 305, acquiring a second key value, and determining a target process from a plurality of target candidate processes determined based on the plurality of physical machines based on the second key value.

Step 306, acquiring the configuration information using the target process.

The description of step 301, step 305, and step 306 in the present embodiment is consistent with the description of step 201, step 203, and step 204, and detailed description thereof will be omitted.

Compared with the embodiment described in FIG. 2, when determining the target candidate process, the present embodiment uses the consistent hashing to determine the target candidate process from the set of candidate processes. When the candidate processes in the set of candidate processes undergo update operations such as increase or decrease, it is not necessary to adjust the first key value or adjust the first consistent hashing and other parameters/algorithms used to determine the target candidate process, that is, the target candidate process may be determined based on the updated set of candidate processes, which may improve the stability of determining the target candidate process and reduce system maintenance costs.

In some alternative implementations of the embodiment described above in conjunction with FIG. 2 and FIG. 3, the determining a target process from a plurality of target candidate processes determined based on the plurality of physical machines based on the second key value, includes: acquiring an identifier of each target candidate process in the plurality of target candidate processes; determining a target identifier using the identifier of the target candidate process and the second key value, and based on a second consistent hashing; and determining a target candidate process corresponding to the target identifier as the target process.

In the present embodiment, the executing body may read the identifier of each target candidate process locally, or read the identifier of each target candidate process from the storage unit of the corresponding physical machine. The identifier of the target candidate process may be a digital identifier such as an IP address of the target candidate process or coding of the target candidate process. Then, the target identifier is determined using the identifier of the candidate process and the second key value, and based on the second consistent hashing.

A preset hash algorithm may be used to calculate a hash value corresponding to the identifier of each target candidate process, and assign each hash value on a hash ring; the preset hash algorithm is used to calculate a hash value of the second key value, and assign the hash value of the second key value on the hash ring; move the hash value of the second key value clockwise on the hash ring, and move to an identifier corresponding to a first hash value, which is determined as the target identifier, and in the plurality of target candidate processes, the process identified as the target identifier is determined as the target process.

It should be noted that the second consistent hashing may be the same consistent hashing with the first consistent hashing in the embodiment of FIG. 3 or a different consistent hashing. The preset hash algorithm in the present embodiment may be the same hash algorithm with the preset hash algorithm in the embodiment of FIG. 3 or a different hash algorithm.

In the present embodiment, the consistent hashing is used to determine the target process from the plurality of target candidate processes. When the plurality of target candidate processes are updated, there is no need to adjust the second key value or adjust the second consistent hashing and other parameters/algorithms used to determine the target process, that is, the target process may be determined based on the updated plurality of target candidate processes, which may improve the stability of determining the target process and reduce system maintenance costs.

In some alternative implementations of the embodiment described above in conjunction with FIG. 2 and FIG. 3, the method for acquiring information further includes: sending the configuration information to the plurality of target candidate processes using the target process; and sending, for each of the plurality of physical machines, the configuration information to each candidate process in the physical machine, using the target candidate process in the physical machine.

In the present embodiment, after acquiring the configuration information using the target process, the executing body may send the configuration information to the target candidate process of each physical machine in the plurality of physical machines using the target process. Then, for each physical machine, the target candidate process is used to send the configuration information acquired by the target candidate process to each candidate process in the physical machine.

As shown in FIG. 4, FIG. 4 shows a schematic diagram of a path, in a physical machine cluster composed of a plurality of physical machines, after a target process acquires configuration information, it sends the configuration information to processes in a physical machine of the target process, and sends the configuration information to target candidate processes in the physical machines of the physical machine cluster, and the target candidate process sends the configuration information to the processes in its respective physical machine.

In the present embodiment, after the target process acquires the configuration information, the configuration information is sent to the target candidate process in each physical machine, and the target candidate process in each physical machine sends the configuration information for candidate processes in the physical machine, so that a plurality of target candidate processes may be synchronized to send the information for the candidate processes in the physical machines, realizing synchronous sending of the configuration information and improving the efficiency of sending the configuration information.

In some alternative implementations of the embodiment described above in conjunction with FIG. 2 and FIG. 3, the configuration information includes at least one of: an operation instruction, an access path of a data source, or data stored in a data source.

In the present embodiment, the configuration information may include at least one of: an operation instruction, an access path of a data source, or data stored in a data source. The operation instruction refers to an instruction used to indicate a process to call which program or when to run a preset program; the access path of the data source refers to an acquisition path of data required by a process; and the data stored in the data source refers to data required by a process.

For example, after the server receives an instruction for acquiring configuration information, for each of a plurality of physical machines, it determines a set of candidate processes of the physical machine, acquires a first key value, and determines a target candidate process of the physical machine from the set of candidate processes based on the first key value, acquires a second key value, and determines a target process from a plurality of target candidate processes determined based on the plurality of physical machines based on the second key value, and acquires the configuration information using the target process.

Then, the server sends the configuration information to the plurality of target candidate processes using the target process, and using each target candidate process in each physical machine, sends the configuration information to each candidate process in the physical machine, which allows each candidate process to run a corresponding preset program based on the acquired operation instruction, or present corresponding information based on the acquired data.

With further reference to FIG. 5, illustrating a flow 500 of an embodiment of a method for acquiring information according to the present disclosure. The method for acquiring information is applied to a data distribution network, the data distribution network includes a plurality of physical machine clusters, each physical machine cluster may include a plurality of physical machines, the plurality of physical machine clusters belong to a plurality of network layers, and the method for acquiring information includes the following steps: each physical machine cluster may use the method in the embodiment described in FIG. 2 and FIG. 3 to acquire configuration information;

Step 501, determining, for a plurality of physical machine clusters in each network layer, a target physical machine cluster in the network layer.

In the present embodiment, an executing body of the method for acquiring information (for example, the server shown in FIG. 1) may determine the target physical machine cluster belonging to the network layer for the plurality of physical machine clusters belonging to each network layer. Specifically, the target physical machine cluster in the network layer may be designated for each network layer in advance, or the target physical machine cluster may be determined based on a user's instruction.

Step 502, acquiring, in response to determining that the network layer is not a preset layer in the data distribution network, configuration information from an upper-level target process using a target process in the target physical machine cluster, where the upper-level target process includes: the target process of the target physical machine cluster in an upper-level network layer of the network layer.

In the present embodiment, if it is determined that the current network layer is not a preset layer in the data distribution network, the target process in the target physical machine cluster may be used to acquire the configuration information from the upper-level target process. The preset layer may be a first network layer in the data distribution network (i.e., a network layer closest to the source site where the configuration information is stored), or a middle network layer in the data distribution network, or a network layer having the number of sub-nodes (i.e., lower-level physical machine clusters) in the data distribution network being greater than a preset number of physical machine clusters. The method for determining the target process in the target physical machine cluster may use the method for determining a target process in the embodiment described in FIG. 2 and FIG. 3. The upper-level target process refers to the target process of the target physical machine cluster in the upper-level network layer of the current network layer in the data distribution network.

The method for acquiring information provided by the present embodiment, for a plurality of physical machine clusters in each network layer in the data distribution network, determining a target physical machine cluster in the network layer, and after determining that the network layer is not a preset layer in the data distribution network, acquiring configuration information from an upper-level target process using a target process in the target physical machine cluster. The method may realize gradual convergence of the processes for acquiring configuration information in a data distribution network, avoid network congestion caused by each process acquiring configuration from a configuration center or source site in the data distribution network, and also avoid the problem of low information acquisition efficiency.

Alternatively, the method for acquiring information further includes: acquiring, in response to determining that the network layer is the preset layer in the data distribution network, configuration information from a source site using the target process in the target physical machine cluster.

In the present embodiment, if it is determined that the current network layer is the preset layer in the data distribution network, the target process in the target physical machine cluster may be used to acquire the configuration information from the source site of the configuration information. The preset layer may be a first network layer in the data distribution network (i.e., a network layer closest to the source site where the configuration information is stored), or a middle network layer in the data distribution network, or a network layer having the number of sub-nodes (i.e., lower-level physical machine clusters) in the data distribution network being greater than a preset number of physical machine clusters.

In the present embodiment, the preset layer is set, and the target process in the target physical machine cluster at the preset network layer is used to acquire the configuration information from the source site. The task of acquiring configuration information may be distributed to a plurality of network layers in the data distribution network to improve the efficiency of the data distribution network to acquire configuration information and improve the system's anti-risk ability.

Alternatively, the determining a target physical machine cluster in the network layer, includes: acquiring a plurality of target processes of the plurality of physical machine clusters in the network layer; acquiring a third key value, and determining a final selection process from the plurality of target processes based on the third key value; and determining a physical machine cluster to which the final selection process belongs as the target physical machine cluster.

In the present embodiment, in each network layer, the method for determining a target physical machine cluster in the network layer may be: acquiring a plurality of target processes of the plurality of physical machine clusters in the network layer, acquiring a third key value, and determining a final selection process from the plurality of target processes based on the third key value, and determining a physical machine cluster to which the final selection process belongs as the target physical machine cluster. The third key value may be a random number or a preset value. The executing body may determine the final selection process from the plurality of target processes based on this random number or the preset value, and determine the physical machine cluster to which the final selection process belongs as the target physical machine cluster.

Figure 6:
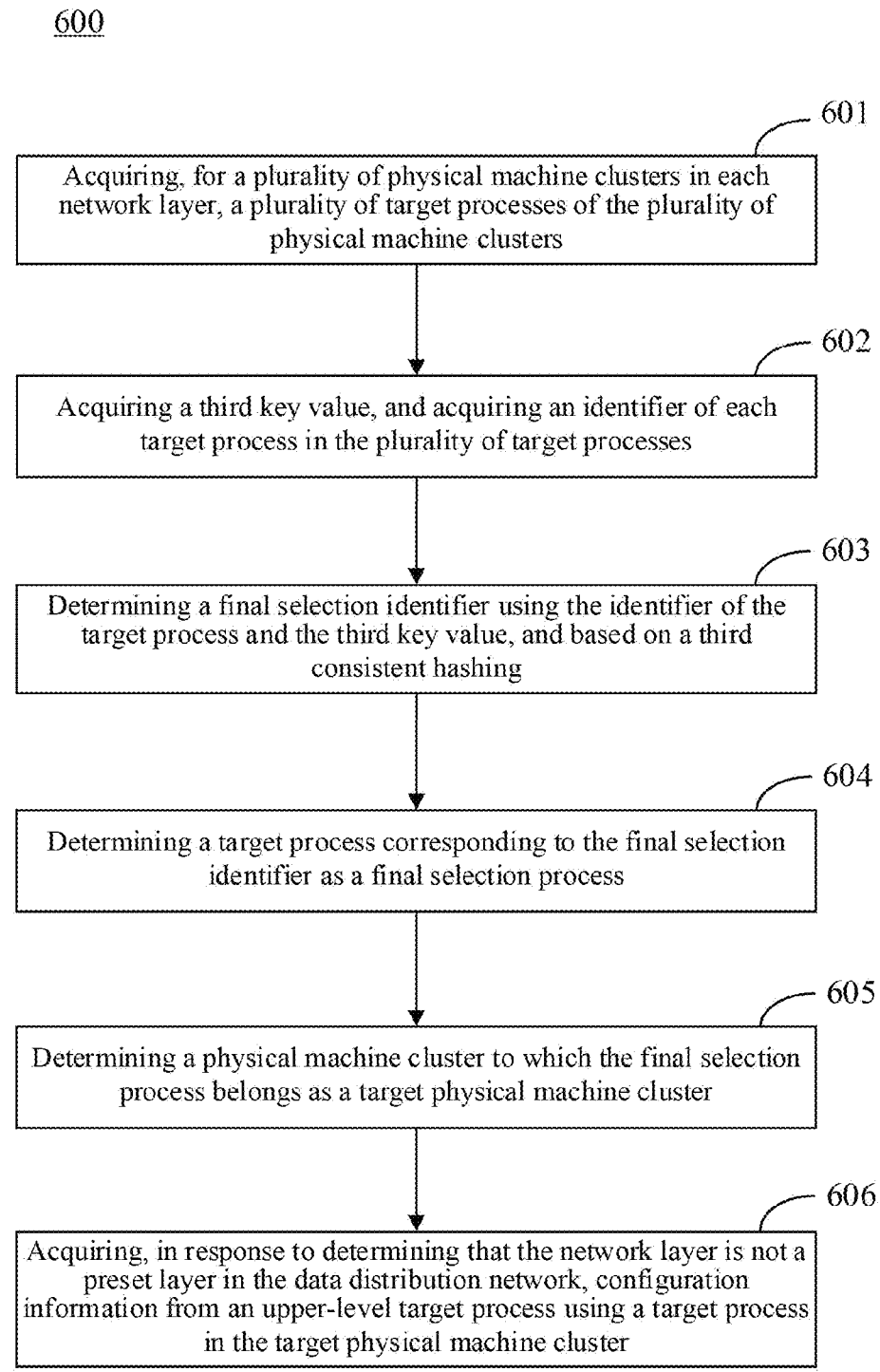
FIG. 6 is a flowchart of another embodiment of the method for acquiring information according to the present disclosure.

With further reference to FIG. 6, illustrating a flow 600 of another embodiment of the method for acquiring information. The flow 600 of the method for acquiring information is applied to a data distribution network, the data distribution network includes a plurality of physical machine clusters, the physical machine cluster includes a plurality of physical machines, the plurality of physical machine clusters belong to a plurality of network layers, and the physical machine cluster use the method in the embodiment described in FIG. 2 or FIG. 3 to acquire configuration information;

Step 601, acquiring, for a plurality of physical machine clusters in each network layer, a plurality of target processes of the plurality of physical machine clusters.

In the present embodiment, the executing body of the method for acquiring information (for example, the server shown in FIG. 1) may, for each network layer, for the plurality of physical machine clusters belonging to the network layer, use the method for determining a target process in the embodiment described in FIG. 2 or FIG. 3, to determine the target process in each physical machine cluster. Thus, the plurality of target processes in the network layer may be obtained based on the plurality of physical machine clusters.

Step 602, acquiring a third key value, and acquiring an identifier of each target process in the plurality of target processes.

In the present embodiment, the executing body may read the preset third key value locally, or read the third key value input by the user through a terminal device. The executing body may read the identifier of each target process locally, or read the identifier of each target process from a storage unit of the corresponding physical machine cluster. The identifier of the target process may be a digital identifier such as an IP address of the target process or coding of the target process.

Step 603, determining a final selection identifier using the identifier of the target process and the third key value, and based on a third consistent hashing.

In the present embodiment, the executing body may determine the final selection identifier using the identifier of the target process and the third key value, and based on the third consistent hashing. A preset hash algorithm may be used to calculate a hash value corresponding to the identifier of each target process, and assign the hash value on a hash ring; the preset hash algorithm is used to calculate a hash value of the third key value, and assign the hash value of the third key value on the hash ring; move the hash value of the third key value clockwise on the hash ring, and move to an identifier corresponding to a first hash value, which is determined as the final selection identifier.

Step 604, determining a target process corresponding to the final selection identifier as the final selection process.

In the present embodiment, in the plurality of target processes, the process identified as the final selection identifier is determined as the final selection process.

Step 605, determining a physical machine cluster to which the final selection process belongs as the target physical machine cluster.

In the present embodiment, the physical machine cluster to which the physical machine containing the final selection process belongs may be determined as the target physical machine cluster in the network layer.

Step 606, acquiring, in response to determining that the network layer is not a preset layer in the data distribution network, configuration information from an upper-level target process using a target process in the target physical machine cluster, where the upper-level target process includes: the target process of the target physical machine cluster in an upper-level network layer of the network layer.

The description of step 606 in the present embodiment is consistent with the description of step 502, and detailed description thereof will be omitted.

Compared with the embodiment described in FIG. 5, when determining the final selection process, the present embodiment uses the third consistent hashing to determine the final selection process from the plurality of target processes. When the plurality of target processes are updated, there is no need to adjust the third key value or adjust the third consistent hashing and other parameters/algorithms used to determine the target process, that is, the final selection process may be determined based on the updated plurality of target processes, which may improve the stability of determining the final selection process and reduce system maintenance costs.

Figure 7:
FIG. 7 is a schematic diagram of an application scenario of the method for acquiring information according to some embodiments of the present disclosure.

In some application scenarios, as shown in FIG. 7, the data distribution network includes physical machine clusters 701, 702, 703, 704, and 705.

Each physical machine cluster contains a plurality of physical machines: the physical machine cluster 701 includes physical machines 7011, 7012, 7013, 7014; the physical machine cluster 702 includes physical machines 7021, 7022, 7023, 7024; the physical machine cluster 703 includes physical machines 7031, 7032, 7033, 7034; the physical machine cluster 704 includes physical machines 7041, 7042, 7043, 7044; and the physical machine cluster 705 includes physical machines 7051, 7052, 7053, and 7054. Each physical machine contains a plurality of processes.

The plurality of physical machine clusters belong to a plurality of network layers: the physical machine cluster 701 belongs to a third-level network layer, the physical machine clusters 702 and 703 belong to a second-level network layer, and the physical machine clusters 704 and 705 belong to a first-level network layer.

Firstly, for each physical machine cluster in the data distribution network (for example, the physical machine cluster 701, 702, 703, 704, or 705), the method for determining a target process in the physical machine cluster includes: after receiving a request for acquiring configuration information, a processing server/processing unit in the data distribution network determining, for each physical machine in the physical machine cluster, a set of candidate processes of the physical machine; acquiring a first key value, and determining a target candidate process of the physical machine from the set of candidate processes based on the first key value; acquiring a second key value, and determining a target process of the physical machine cluster from a plurality of target candidate processes determined based on the plurality of physical machines in the physical machine cluster based on the second key value. Therefore, there is a target process in each physical machine cluster.

Secondly, the processing server/processing unit in the data distribution network may determine a target physical machine cluster in each network layer based on user settings. If the current network layer is not a preset layer in the data distribution network, a target process in the target physical machine cluster in the current network layer (the target process in the target physical machine cluster, that is, a final selection process in the current network layer) is used to acquire configuration information from an upper-level target process. For example, if the target physical machine cluster in the first-level network layer is set as the physical machine cluster 704, and the target physical machine cluster in the second-level network layer is the physical machine cluster 702, then the target process in the physical machine cluster 704 may be used to acquire the configuration information from the target process in the physical machine cluster 702.

If the current network layer is the preset layer in the data distribution network, the target process in the target physical machine cluster in the current network layer is used to acquire configuration information from a source site. For example, if a top layer in the data distribution network is set as the preset layer (the third-level network layer in FIG. 7), the target process in the physical machine cluster 701 in the third-level network layer needs to acquire the configuration information from the source site.

After the target process in the physical machine cluster 701 in the third-level network layer acquires the configuration information from the source site, the configuration information is sent level by level, that is, the configuration information is sent to the target process in the target physical machine cluster (physical machine cluster 702) in the second-level network layer, and the target process sends the configuration information to the target process in the physical machine cluster 703 in the same-level network layer, and sends the configuration information to the target process in the target physical machine cluster (physical machine cluster 704) in the lower-level network layer. As a result, the target process in each physical machine cluster in the data distribution network acquires the configuration information.

Then, for each physical machine cluster, the target process sends the configuration information to target candidate processes in other physical machines in the physical machine cluster except for the physical machine to which the target process belongs. As a result, the target candidate process in each physical machine acquire the configuration information.

Finally, for each physical machine, the target candidate process in the physical machine is used to send the configuration information to other processes in the physical machine. As a result, each process acquires the configuration information.

In this application scenario, only one process in each physical machine cluster requests configuration information from a configuration center or the upper-level target process, which reduces the response times of a configuration information request interface and improves a system response rate. The method for sending configuration information level by level and in parallel improves the efficiency of sending configuration information. In addition, since the configuration sending process is a parallel process, after adding processes, physical machines, or physical machine clusters in a physical machine, configuration sending time may not increase, which improves the scalability of the system.

Figure 8:
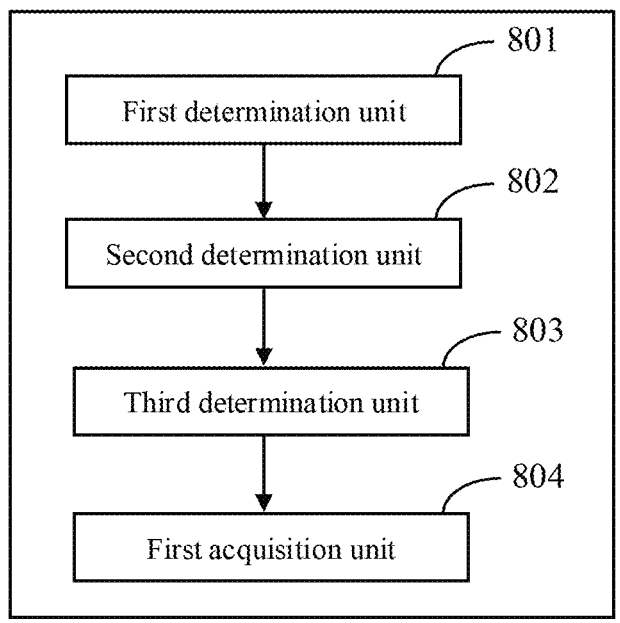
FIG. 8 is a schematic structural diagram of an embodiment of an apparatus for acquiring information according to the present disclosure.

With further reference to FIG. 8, as an implementation of the method shown in the above figures, the present disclosure provides an embodiment of an apparatus for acquiring information. The apparatus embodiment corresponds to the method embodiment as shown in FIG. 2 and FIG. 3. The apparatus may be applied to various electronic devices.

As shown in FIG. 8, an apparatus 800 for acquiring information of the present embodiment includes: a first determination unit 801, a second determination unit 802, a third determination unit 803, a first acquisition unit 804. The first determination unit is configured to determine, in response to receiving an instruction used to indicate to acquire configuration information, for each of a plurality of physical machines, a set of candidate processes of the physical machine. The second determination unit is configured to acquire a first key value, and determine a target candidate process of the physical machine from the set of candidate processes based on the first key value. The third determination unit is configured to acquire a second key value, and determine a target process from a plurality of target candidate processes determined based on the plurality of physical machines based on the second key value. The first acquisition unit is configured to acquire the configuration information using the target process.

In some embodiments, the first determination unit includes: a first acquisition module, configured to acquire operating status information of a process in the physical machine; and a first determination module, configured to determine, in response to determining that the operating status information satisfies a preset condition, the process corresponding to the operating status information as a process in the set of candidate processes.

In some embodiments, the second determination unit includes: a second acquisition module, configured to acquire an identifier of each candidate process in the set of candidate processes; a first coding module, configured to determine a target candidate identifier using the identifier of the candidate process and the first key value, and based on a first consistent hashing; and a second determination module, configured to determine a candidate process corresponding to the target candidate identifier as the target candidate process.

In some embodiments, the third determination unit includes: a third acquisition module, configured to acquire an identifier of each target candidate process in the plurality of target candidate processes; a second coding module, configured to determine a target identifier using the identifier of the target candidate process and the second key value, and based on a second consistent hashing; and a third determination module, configured to determine a target candidate process corresponding to the target identifier as the target process.

In some embodiments, the apparatus further includes: a first sending unit, configured to send the configuration information to the plurality of target candidate processes using the target process; and a second sending unit, configured to send, for each of the plurality of physical machines, the configuration information to each candidate process in the physical machine, using the target candidate process in the physical machine.

In some embodiments, the configuration information includes at least one of: an operation instruction, an access path of a data source, or data stored in a data source.

The units in the apparatus 800 corresponds to the steps in the method described with reference to FIG. 2 and FIG. 3. Therefore, the operations, features, and achievable technical effects described above for the method for acquiring information are also applicable to the apparatus 800 and the units contained therein, and detailed description thereof will be omitted.

Figure 9:
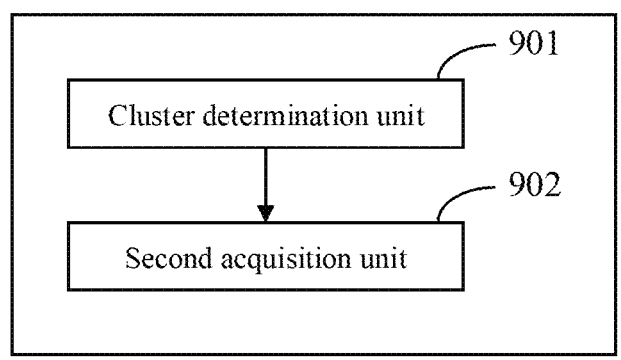
FIG. 9 is a schematic structural diagram of an embodiment of an apparatus for acquiring information according to the present disclosure.

With further reference to FIG. 9, as an implementation of the method shown in the above figures, the present disclosure provides an embodiment of an apparatus for acquiring information. The apparatus embodiment corresponds to the method embodiment as shown in FIG. 5 and FIG. 6. The apparatus may be applied to various electronic devices.

As shown in FIG. 9, an apparatus 900 for acquiring information of the present embodiment is applied to a data distribution network, the data distribution network includes a plurality of physical machine clusters, the physical machine cluster includes a plurality of physical machines, the plurality of physical machine clusters belong to a plurality of network layers, and the apparatus including: the physical machine cluster uses the apparatus in the embodiment described in FIG. 8 to acquire configuration information; a cluster determination unit 901, a second acquisition unit 902. The cluster determination unit is configured to determine, for a plurality of physical machine clusters in each network layer, a target physical machine cluster in the network layer; a second acquisition unit, configured to acquire, in response to determining that the network layer is not a preset layer in the data distribution network, configuration information from an upper-level target process using a target process in the target physical machine cluster, where the upper-level target process includes: the target process of the target physical machine cluster in an upper-level network layer of the network layer.

In some embodiments, the apparatus for acquiring configuration information further includes: a third acquisition unit, configured to acquire, in response to determining that the network layer is the preset layer in the data distribution network, configuration information from a source site using the target process in the target physical machine cluster.

In some embodiments, the cluster determination unit includes: a fourth acquisition module, configured to acquire a plurality of target processes of the plurality of physical machine clusters in the network layer; a final selection process determination module, configured to acquire a third key value, and determine a final selection process from the plurality of target processes based on the third key value; and a cluster determination module, configured to determine a physical machine cluster to which the final selection process belongs as the target physical machine cluster.

In some embodiments, the final selection process determination module includes: a fifth acquisition module, configured to acquire an identifier of each target process in the plurality of target processes; a third coding module, configured to determine a final selection identifier using the identifier of the target process and the third key value, and based on a third consistent hashing; and a final selection process determination module, configured to determine a target process corresponding to the final selection identifier as the final selection process.

The units in the apparatus 900 corresponds to the steps in the method described with reference to FIG. 5 and FIG. 6. Therefore, the operations, features, and achievable technical effects described above for the method for acquiring information are also applicable to the apparatus 900 and the units contained therein, and detailed description thereof will be omitted.

According to an embodiment of the present disclosure, the present disclosure also provides an electronic device, a readable storage medium, and a computer program product.

Figure 10:
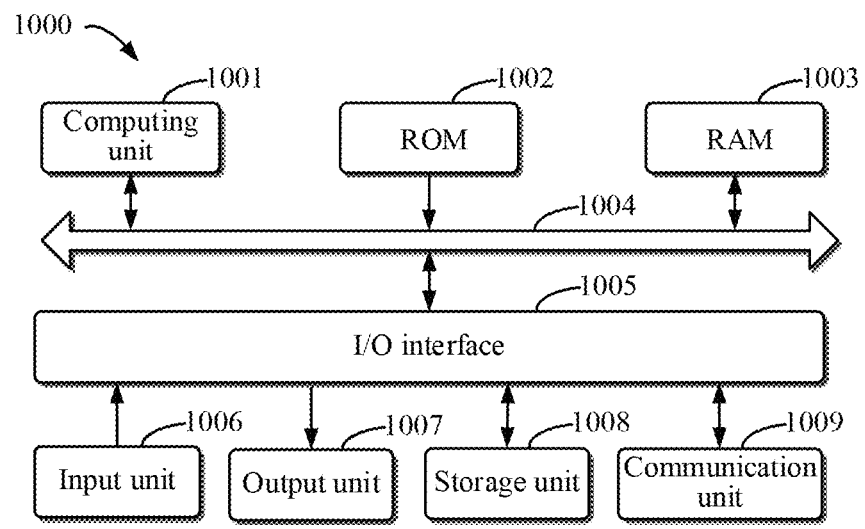
FIG. 10 is a block diagram of an electronic device used to implement the method for acquiring information according to an embodiment of the present disclosure.

FIG. 10 shows a schematic block diagram of an example electronic device 1000 that can be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the device 1000 includes a computation unit 1001, which may execute various appropriate actions and processes in accordance with a computer program stored in a read-only memory (ROM) 1002 or a computer program loaded into a random access memory (RAM) 1003 from a storage unit 1008. The RAM 1003 also stores various programs and data required by operations of the device 1000. The computation unit 1001, the ROM 1002 and the RAM 1003 are connected to each other through a bus 1004. An input/output (I/O) interface 1005 is also connected to the bus 1004.

The following components in the device 1000 are connected to the I/O interface 1005: an input unit 1006, for example, a keyboard and a mouse; an output unit 1007, for example, various types of displays and a speaker; a storage device 1008, for example, a magnetic disk and an optical disk; and a communication unit 1009, for example, a network card, a modem, a wireless communication transceiver. The communication unit 1009 allows the device 1000 to exchange information/data with an other device through a computer network such as the Internet and/or various telecommunication networks.

The computation unit 1001 may be various general-purpose and/or special-purpose processing assemblies having processing and computing capabilities.

Some examples of the computation unit 1001 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 1001 performs the various methods and processes described above, for example, the method for acquiring information. For example, in some embodiments, the method for acquiring information may be implemented as a computer software program, which is tangibly included in a machine readable medium, for example, the storage device 1008. In some embodiments, part or all of the computer program may be loaded into and/or installed on the device 1000 via the ROM 1002 and/or the communication unit 1009. When the computer program is loaded into the RAM 1003 and executed by the computation unit 1001, one or more steps of the above method for acquiring information may be performed. Alternatively, in other embodiments, the computation unit 1001 may be configured to perform the method for acquiring information through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of some embodiments of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

It should be appreciated that the steps of reordering, adding or deleting may be executed using the various forms shown above. For example, the steps described in embodiments of the present disclosure may be executed in parallel or sequentially or in a different order, so long as the expected data of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. An electronic device, applied to a data distribution network, the data distribution network comprising a plurality of physical machine clusters, each physical machine cluster comprising a plurality of physical machines, comprising:
   at least one processor; and
   a memory, communicatively connected to the at least one processor; wherein,
   the memory, storing instructions executable by the at least one processor, the instructions, when executed by the at least one processor, cause the at least one processor to perform second operations for acquiring information, the second operations applied to a data distribution network, the data distribution network comprising a plurality of physical machine clusters, each physical machine cluster comprising a plurality of physical machines, the plurality of physical machine clusters belonging to a plurality of network layers, and the second operations comprising: the physical machine cluster using the first operations to acquire configuration information;
   determining, for a plurality of physical machine clusters in each network layer, a target physical machine cluster in the network layer; and
   acquiring, in response to determining that the network layer is not a preset layer in the data distribution network, configuration information from an upper-level target process using a target process in the target physical machine cluster, wherein the upper-level target process comprises: the target process of the target physical machine cluster in an upper-level network layer of the network layer;
   wherein the first operations comprise:
      determining a set of candidate processes of a physical machine, in response to receiving an instruction used to indicate to acquire the configuration information, for each physical machine of the plurality of physical machines;
      acquiring a first key value, and determining a target candidate process of the physical machine from the set of candidate processes based on the first key value;
      acquiring a second key value, and determining a target process from a plurality of target candidate processes determined based on the plurality of physical machines based on the second key value; and acquiring the configuration information using the target process, wherein the set of candidate processes is to run a corresponding preset program based on the configuration information.

2. The device according to claim 1, wherein the second operations further comprise:

acquiring, in response to determining that the network layer is the preset layer in the data distribution network, configuration information from a source site using the target process in the target physical machine cluster.

3. The device according to claim 1, wherein determining the target physical machine cluster in the network layer, comprises:

acquiring a plurality of target processes of the plurality of physical machine clusters in the network layer;

acquiring a third key value, and determining a final selection process from the plurality of target processes based on the third key value; and determining a physical machine cluster to which the final selection process belongs as the target physical machine cluster.

4. The device according to claim 1, wherein determining the set of candidate processes of the physical machine, comprises:

acquiring operating status information of a process in the physical machine; and determining, in response to determining that the operating status information satisfies a preset condition, the process corresponding to the operating status information as a process in the set of candidate processes.

5. The device according to claim 1, wherein determining the target candidate process of the physical machine from the set of candidate processes based on the first key value, comprises:

acquiring an identifier of each candidate process in the set of candidate processes;

determining a target candidate identifier using the identifier of the candidate process and the first key value, and based on a first consistent hashing; and determining a candidate process corresponding to the target candidate identifier as the target candidate process.

6. The device according to claim 1, wherein determining the target process from the plurality of target candidate processes determined based on the plurality of physical machines based on the second key value, comprises:

acquiring an identifier of each target candidate process in the plurality of target candidate processes;

determining a target identifier using the identifier of the target candidate process and the second key value, and based on a second consistent hashing; and determining a target candidate process corresponding to the target identifier as the target process.

7. The device according to claim 1, wherein the first operations further comprise:

sending the configuration information to the plurality of target candidate processes using the target process; and sending, for each of the plurality of physical machines, the configuration information to each candidate process in the physical machine, using the target candidate process in the physical machine.

8. The device according to claim 1, wherein the configuration information comprises at least one of an operation instruction, an access path of a data source, or data stored in a data source.

* * * * *